Feb. 9, 1926. 1,572,791
F. N. GUYMON
POWER OPERATING ATTACHMENT FOR SHEEP SHEARS
Filed Sept. 19, 1925 2 Sheets-Sheet 1
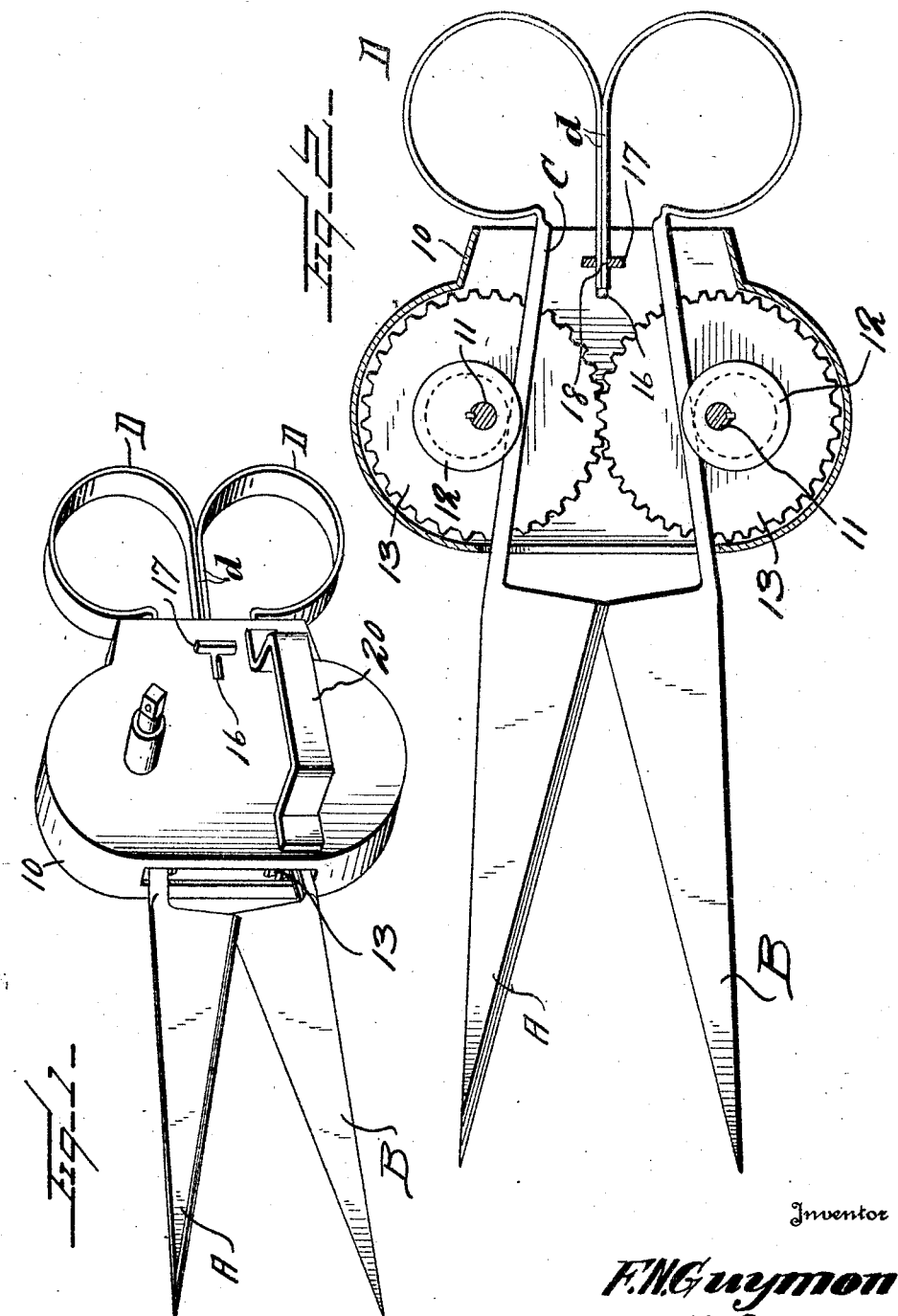

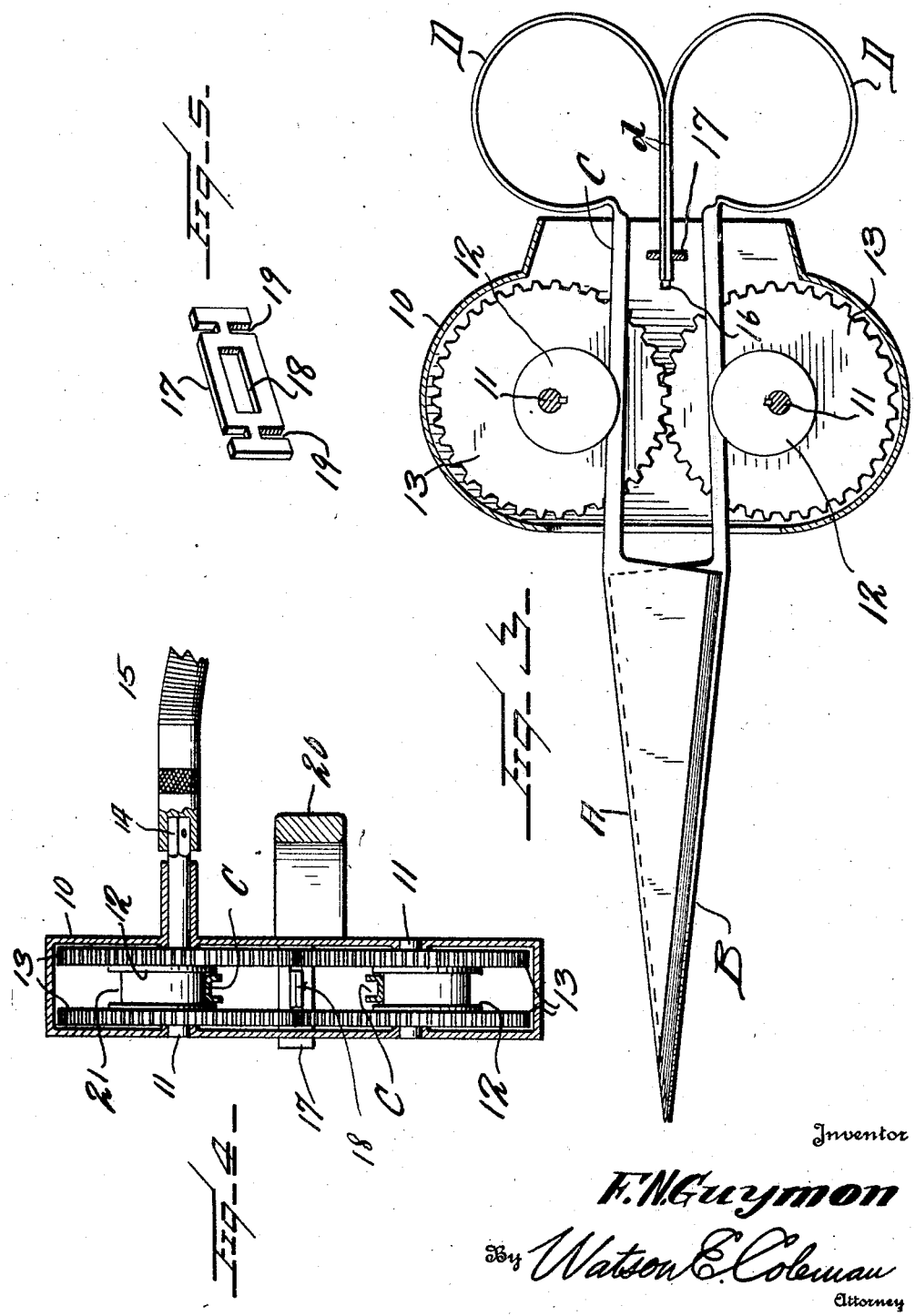

Patented Feb. 9, 1926.

1,572,791

UNITED STATES PATENT OFFICE.

FRANKLIN N. GUYMON, OF HUNTINGTON, UTAH, ASSIGNOR OF ONE-SIXTH TO JAMES P. JOHNSON, OF HUNTINGTON, UTAH.

POWER-OPERATING ATTACHMENT FOR SHEEP SHEARS.

Application filed September 19, 1925. Serial No. 57,367.

*To all whom it may concern:*

Be it known that I, FRANKLIN N. GUYMON, a citizen of the United States, residing at Huntington, in the county of Emery and State of Utah, have invented certain new and useful Improvements in Power-Operating Attachments for Sheep Shears, of which the following is a specification, reference being had to the accompanying drawings.

This invention relates to shears such as are used for shearing sheep and other animals, and particularly to means whereby ordinary sheep shears commonly operated by hand may be operated by power.

Sheep shearing today is very largely accomplished by power operated shears on the order of clippers used by barbers and others, but in many places most or all of the shearing is done by the use of the ordinary sheep shears wherein two blades are urged away from each other by springs and are brought into a shearing position by hand grip.

The object of the present invention is to provide means whereby power may be applied to shears of this type to cause the shear blades to be oscillated so that the shears may be simply guided by hand and the shears be operated by power.

My invention is illustrated in the accompanying drawings, wherein:—

Figure 1 is a perspective view of a pair of sheep shears with my attachment applied thereto;

Figure 2 is a vertical section from front to rear of the attachment and with the shears open;

Figure 3 is a like view to Figure 2 but showing the shears closed;

Figure 4 is a vertical sectional view through the attachment;

Figure 5 is a perspective view of the key for holding the attachment in place;

Referring to these drawings, it will be seen that I have illustrated a pair of ordinary sheep shears consisting of the blades A and B, the tangs C, and the springs D. The springs are connected to the extremities of the tangs, then the springs bent circularly outward and then toward each other and then longitudinally, these longitudinal parallel portions of the springs being designated $d$.

My device embodies a metallic casing or housing 10 which has a thickness greater than the thickness of the tangs C and which is adapted to fit over the same between the springs D and the beginning of the blades. This casing 10 has extending transversely through it the two shafts 11. Each of these shafts carries an eccentric 12 which bears against the outer edge of the corresponding tang C. It will be obvious that as the shaft 11 is revolved, the eccentrics will cause the tangs to be alternately forced toward each other and away from each other by the springs D.

For the purpose of securing a coordinate rotation of the eccentrics, I provide intermeshing gear wheels 13 mounted on each of the shafts. Preferably there are two of these gears on each shaft meshing with two gear wheels on the corresponding shaft. One of these shafts is formed, as at 14, to receive a power operated flexible shaft 15 of any ordinary or suitable character such as commonly used in connection with barbers' clippers, dental instruments, etc., the shaft 15 being flexible and being provided with a socket to receive the extremity of the shaft 11 or with a member adapted to be inserted in the socket of the shaft 11. Any suitable means whereby the shaft 15 may be connected to the shaft 14 may be used.

It will be obvious now that when power is applied to the shaft 14, the shaft 11 will be rotated, thus rotating the gear wheels 13 coordinately and rotating the eccentrics, which will cause the oscillation of the blades A and B. For the purpose of holding the housing 10 upon the blades and locking the housing in place, I form the opposite walls of the housing with the diametrically extending slot 16 and provide a key 17 extending through this slot. This key, as illustrated, is formed with a longitudinally extending slot 18 and outward of the slot or between the ends of this slot 18 and the ends of the key there are formed the transverse notches 19. These notches are adapted to receive the walls of the housing 10 and the slot 18 is adapted to receive the parallel ends $d$ of the springs D. This pin 17 holds the case or housing 10 firmly on the shears and the rotation of the wheels 13 has a tendency to force the case backward, causing it to even more firmly bind in place upon the shears. Of course, it will be understood that the case is open at its opposite ends so that the shears pass entirely through the case. One face of the case is provided with a handle 20 whereby the shears may be manipulated and guided.

The eccentrics 12 are each preferably formed with a groove 21, thus providing flanges forming the walls of the groove which fit over and partially embrace the shanks or tangs C. The utility of the device will be obvious and by its means ordinary sheep shears may be readily converted into power operated shears with all the advantages thereof.

While I have illustrated an embodiment of my invention which I believe to be particularly effective, I do not wish to be limited thereto as it is obvious that many changes might be made therein without departing from the spirit of the invention as defined in the appended claims.

I claim:—

1. A power operating attachment for sheep shears comprising a casing through which the shanks of shears may be disposed, eccentrics mounted within the casing, one for each shank, and adapted to engage the shanks of the shears, power operated means for operating the eccentrics including a shaft extending to the exterior of the casing and having means whereby a flexible shaft may be connected thereto.

2. A power operating attachment for sheep shears including a casing open at its ends and through which the shanks of a pair of sheep shears may be disposed, shafts passing through the casing, eccentrics mounted upon the shafts, one for each shank, and adapted to engage the outer edges of the shanks, and intermeshing gear wheels mounted upon the shafts, one of said shafts extending out through the casing and being so formed at its outer end that it may be connected to a flexible driving shaft.

3. A power operating attachment for sheep shears including a casing through which the shanks of sheep shears may be inserted, shafts passing through the casing, eccentrics mounted upon the shafts, one for each shank, and bearing against the outer faces of the shanks, means whereby power may be applied to cause the rotation of the eccentrics, and means for locking the casing upon the sheep shears.

4. A power operating attachment for sheep shears including a casing through which the shanks of sheep shears may be inserted, shafts passing through the casing, eccentrics mounted upon the shafts, one for each shank, and bearing against the outer faces of the shanks, means whereby power may be applied to cause the rotation of the eccentrics, means for locking the casing upon the sheep shears including a longitudinally extending slot in the opposite walls of the casing, and a pin insertible through said slot and having a slot to receive the end portions of the springs of sheep shears and having means for engaging the walls of the casing, the outer face of the casing being provided with a handle.

5. The combination with a pair of sheep shears having blades, shanks and springs, each attached to one of the shanks and extending outward and away from the shanks and then inward toward each other and longitudinally, of a casing open at its front and rear and through which the shears are adapted to be slipped, shafts passing through the casing, eccentrics mounted upon the shafts and adapted to engage the edges of said shanks, intermeshing gear wheels mounted upon the shafts, means on one of said shafts whereby it may be connected to a source of power, and means for locking the casing in place comprising a pin extending transversely across the casing, the walls of the casing being slotted to receive said pin and the pin being notched adjacent its opposite ends to receive said walls, the middle portion of the pin having a longitudinally extending slot to receive the ends of the springs of the shears.

In testimony whereof I hereunto affix my signature.

FRANKLIN N. GUYMON.